United States Patent Office 3,318,875
Patented May 9, 1967

3,318,875
CERTAIN 3-(ACYLALKYL)-3-AZABICYCLO-
[3.2.2.]NONANE COMPOUNDS
William L. Nobles, Oxford, Miss., assignor to the University of Mississippi, Oxford, Miss., a corporation of Mississippi
No Drawing. Filed Mar. 25, 1963, Ser. No. 267,818
8 Claims. (Cl. 260—240)

This invention pertains to a new series of organic compounds demonstrating a high level of antimicrobial activity. These compounds are aminoketones of the structure:

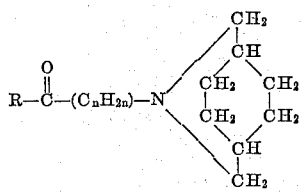

wherein $n$ has a value of from 1 to 5 and R is a nucleus as herein described which may be optionally substituted.

More particularly R may be a heterocyclic group of the structure:

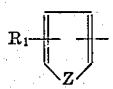

a phenyl group of the structure:

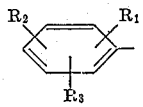

or a vinyl group of the structures:

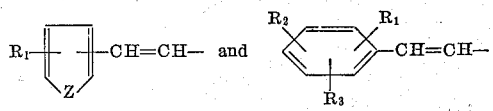

in which Z is oxygen or sulfur and $R_1$, $R_2$ and $R_3$ are alike or different and may be hydrogen, lower alkyl, lower alkoxy, hydroxy, nitro, amino, halogeno, phenyl, trifluoromethyl or the like.

The portion of the above formula represented by —($C_nH_{2n}$)— embraces a branched or straight alkylene chain of from one to five carbon atoms. Of these, ethylene and substituted ethylene are preferred.

When the terms "lower alkyl" or "lower alkoxy" are employed herein there is intended a group comprising a branched or straight chain hydrocarbon group of from one to five carbon atoms.

The term halogen includes the chloro, fluoro, bromo and iodo group.

The compounds of the present invention can be prepared by utilization of the Mannich reaction whereby a ketone of the formula:

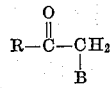

wherein B is hydrogen or lower alkyl and R is as herein defined is reacted with an aldehyde, such as formaldehyde (preferably paraformaldehyde) and 3-azabicyclo[3.2.2.] nonane. The reaction may be executed by refluxing the reactants in an inert organic solvent such as ethanol. The product is readily isolated by cooling and adding an organic solvent such as acetone to decrease solubility and facilitate crystallization.

This invention also includes the pharmaceutically acceptable salts of the above defined bases formed with non- toxic organic and inorganic acids. Such salts are easily prepared by methods known to the art. The base is reacted with either the calculated amount of organic or inorganic acid in aqueous miscible solvent, such as acetone or ethanol, with isolation of the salt by concentration and cooling or an excess of the acid in aqueous immiscible solvent, such as ethyl ether or chloroform, with the desired salt separating directly. These salts may also be prepared by the classical method of double decomposition of appropriate salts which is well-known to the art. Exemplary of such organic salts are those with maleic, fumaric, benzoic, ascorbic, pamoic, succinic, bismethylenesalicylic, methanesulfonic, ethanedisulfonic, acetic, propionic, tartaric, salicylic, citric, glyconic, lactic, malic, mandelic, cinnamic, citraconic, aspartic, stearic, palmitic, itaconic, lycolic, p-aminobenzoic, glutamic, benzene sulfonic and theophylline acetic acids as well as with the 8-halotheophylline, for example, 8-bromotheophylline. Exemplary of such inorganic salts are those with hydrochloric, hydrobromic, sulfuric, sulfamic, phosphoric and nitric acids.

The compounds of this invention exhibit a broad spectrum of antimicrobial activity against such organisms as *Staphylococcus aureus*, *Escherichia coli*, *Klebsiella pneumoniae*, *Proteus vulgaris*, *Candida albicans*, *Trichophyton mentagrophytes* and *Trichomonas foetus*. The activity is particularly pronounced against Trichophyton and Trichomonas.

Of the compounds of the present invention, the preferred compounds are those wherein $n$ has a value of two and R is substituted phenyl group.

The following examples will serve to further typify the nature of this invention but are not to be construed as a limitation thereof.

Example 1

A solution of 12.51 g. (0.1 mole) of 3-azabicyclo [3.2.2.]nonane in 25 ml. of absolute ethanol is adjusted to pH 4 to pH 5 by the careful addition of concentrated hydrochloric acid. To this solution is added an equimolar amount (12 g.) of acetophenone and 4.5 g. of paraformaldehyde. The mixture is heated at reflux for from two to three hours and the reaction mixture then poured into approximately 100 ml. of acetone. This mixture is permitted to attain room temperature and cooled as necessary until crystallization occurs. This material when collected and dried demonstrates a melting point of 199–200° C. When recrystallized from a 3:1 ethanol acetone solution, the product thus obtained, β-[3-(3-azabicyclo [3.2.2.]nonyl)]-ethyl phenyl ketone as the hydrochloride demonstrates a melting point of 201–203° C.

Example 2

Following the procedure of Example 1 but employing equivalent amounts of appropriately substituted acetophenones, the hydrochloride salts of the following compounds are prepared:

| Product: | M.P. ° C. |
|---|---|
| β - [3 - (3 - azabicyclo[3.2.2.]nonyl)] - ethyl 4-nitrophenyl ketone | 202–203 |
| β - [3 - (3 - azabicyclo[3.2.2.]nonyl)] - ethyl 4-nitrophenyl ketone | 202–203 |
| β - [3 - (3 - azabicyclo[3.2.2.]nonyl)] - ethyl 4-methoxyphenyl ketone | 213–214 |
| β-[(3-azabicyclo[3.2.2.]nonyl)]ethyl 4-ethoxyphenyl ketone | 201–202 |
| β-[3-(3-azabicyclo[3.2.2.]nonyl)]-ethyl 2-hydroxyphenyl ketone | 196–197 |
| β - [3 - (3 - azabicyclo[3.2.2.]nonyl)] - ethyl 4-methylphenyl ketone | 220–221 |
| β-[3-(3-azabicyclo[3.2.2.]nonyl)]-ethyl 4-fluorophenyl ketone | 203–204 |

| Product: | M.P. °C. |
|---|---|
| β-[3-(3-azabicyclo[3.2.2.]nonyl)]-ethyl 4-bromophenyl ketone | 211–212 |
| β-[3-(3-azabicyclo[3.2.2.]nonyl)]-ethyl 4-hydroxyphenyl ketone | 226–228 |
| β-[3-(3-azabicyclo[3.2.2.]nonyl)]-ethyl 4-phenylphenyl ketone | 211–212 |
| β-[3-(3-azabicyclo[3.2.2.]nonyl)]-ethyl 3-nitrophenyl ketone | 230–231 |
| β-[3-(3-azabicyclo[3.2.2.]nonyl)]-ethyl 4-ethylphenyl ketone | 211–213 |
| β-[3-(3-azabicyclo[3.2.2.]nonyl)]-ethyl 3-bromophenyl ketone | 217–218 |
| β-[3-(3-azabicyclo[3.2.2.]nonyl)]-ethyl 3-hydroxyphenyl ketone | 210–212 |
| β-[3-(3-azabicyclo[3.2.2.]nonyl)]-ethyl 3,4-dimethylphenyl ketone | 216–216.5 |
| β-[3-(3-azabicyclo[3.2.2.]nonyl)]-ethyl 2,5-dimethylphenyl ketone | 210–211 |
| β-[3-(3-azabicyclo[3.2.2.]nonyl)]-ethyl 4-iodophenyl ketone | 228–230 |
| β-[3-(3-azabicyclo[3.2.2.]nonyl)]-ethyl 4-butoxyphenyl ketone | 193–195 |
| β-[3-(3-azabicyclo[3.2.2.]nonyl)]-ethyl 2-butoxyphenyl ketone | 172–173 |

Example 3

A solution of 12.5 g. (0.1 mole) of 3-azabicyclo[3.2.2.]nonane in 25 ml. of ethanol is adjusted to pH 3 with concentrated hydrochloric acid. To this solution is added 10.9 g. (0.1 mole) of α-acetylfuran and 4.5 g. of paraformaldehyde. The mixture is refluxed for 2 hours and then quenched in 100 ml. of acetone. The solid which forms upon cooling is collected and recrystallized from a 3:1 ethanol-acetone solution to yield β-[3-(3-azabicyclo[3.2.2.]nonyl)]-ethyl 2-furyl ketone hydrochloride, M.P. 217–218° C.

In a similar fashion by employing equivalent quantities of 2-acetyl-5-nitrofuran and 2-acetylthiophene in place of 2-acetylfuran in the procedure of this example there are respectively obtained the compounds β-[3-(3-azabicyclo[3.2.2.]nonyl)]-ethyl 5-nitro-2-furyl ketone hydrochloride, M.P. 212–214° C. and β-[3-(3-azabicyclo[3.2.2.]nonyl)]-ethyl 2-thienyl ketone hydrochloride, M.P. 203–204° C.

Example 4

Fourteen grams of 2-propanoylthiophene are employed in place of 2-acetylfuran in the procedure of Example 3. Upon completion of the steps therein described, there is obtained β-[3-(3-azabicyclo[3.2.2.]nonyl)]-propyl 2-thienyl ketone hydrochloride, M.P. 203.5–204.5° C.

Similarly from 5-bromo-2-propanoylthiophene and 5-chloro-2-propanoylthiophene the following compounds may be respectively obtained: β-[3-(3-azabicyclo[3.2.2.]nonyl)]-propyl 5-bromo-2-thienyl ketone hydrochloride, M.P. 203.5–204.5° C. and β-[3-(3-azabicyclo[3.2.2.]nonyl)]-propyl 5-chloro-2-thienyl ketone hydrochloride, M.P. 202–204° C.

Example 5

A solution of 12.5 g. (0.1 mole) of 3-azabicyclo[3.2.2.]nonane in 25 ml. of ethanol is rendered acidic by the dropwise addition of hydrochloric acid. To this solution are added 14.6 g. (0.1 mole) of 4-phenyl-3-buten-2-one and 4.5 g. of paraformaldehyde. This mixture is refluxed for one hour and then poured into 100 ml. of acetone. After cooling, this mixture is collected by filtration and recrystallized from hot ethanol. The white solid formed is dissolved by the dropwise addition of water, the solution clarified and the solid collected by addition of acetone and filtration. After drying, the product, β-[3-(3-azabicyclo[3.2.2.]nonyl)]-ethyl styryl ketone hydrochloride, demonstrates a melting point of 203.5–204.5° C.

By employing the appropriate ketones in place of 4-phenyl-3-buten-2-one in the procedure of this example, the hydrochlorides of the following compounds are obtained:

| Product: | M.P. °C. |
|---|---|
| β-[3-(3-azabicyclo[3.2.2.]nonyl)]-ethyl 4-chlorostyryl ketone | 217–218 |
| β-[3-(3-azabicyclo[3.2.2.]nonyl)]-ethyl 4-methoxystyryl ketone | 212–213 |
| β-[3-(3-azabicyclo[3.2.2.]nonyl)]-ethyl β-(2-furyl)-vinyl ketone | 198–199 |
| β-[3-(3-azabicyclo[3.2.2.]nonyl)]-ethyl β-(5-nitro-2-furyl)-vinyl ketone | 185–190 |

Example 6

Nine grams (0.026 mole) of β-[3-(3-azabicyclo[3.2.2.]nonyl)]-ethyl 4-nitrophenyl ketone are dissolved in 100 ml. of water and hydrogenated in a Parr apparatus over 5% palladium on activated charcoal at approximately 45 lb./in.² pressure. After thirty minutes, the reaction mixture is filtered and the filtrate concentrated. The solid thus formed is dissolved in ethanol and converted to the free base by treatment with 10% sodium hydroxide. This material is collected, dried and recrystallized from ethanol to yield β-[3-(3-azabicyclo[3.2.2.]nonyl)]-ethyl 4-aminophenyl ketone, M.P. 99–100° C.

Example 7

The hydrochloride salts prepared in any of the preceding examples may be converted to other nontoxic pharmaceutically acceptable salts by conversion to the free amine through treatment with a base, e.g., 10% sodium hydroxide, followed by treatment with the appropriate acid for the salt which was desired.

What is claimed is:

1. A compound selected from the group consisting of a compound of the formula:

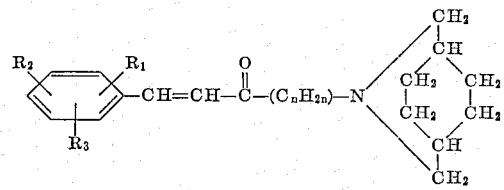

wherein:

each of $R_1$, $R_2$ and $R_3$ is a member selected from the group consisting of hydrogen, lower alkyl, lower alkoxy, hydroxy, nitro, amino, halogeno, trifluoromethyl and phenyl, and $n$ has a value of from 2 to 5 inclusively, there being a 2-carbon alkylene chain separating the keto group and the nitrogen atom, and the nontoxic pharmaceutically acceptable acid addition salts thereof.

2. A compound selected from the group consisting of a compound of the formula:

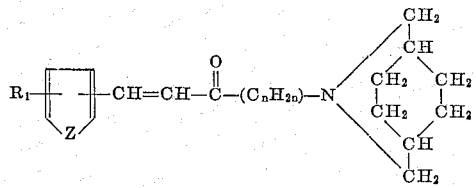

wherein:

Z is a member selected from the group consisting of oxygen, and sulfur, $R_1$ is a member selected from the group consisting of hydrogen, lower alkyl, lower alkoxy, hydroxy, nitro, amino, halogeno, trifluoromethyl and phenyl, and $n$ has a value of from 2 to 5 inclusively, there being a 2-carbon alkylene chain separating the keto group and the nitrogen atom, and the nontoxic pharmaceutically acceptable acid addition salts thereof.

3. β-[2-(3-azabicyclo[3.2.2.]nonyl)]-ethyl styryl ketone.

4. β-[3-(3-azabicyclo[3.2.2.]nonyl)] - ethyl 4-chlorostyryl ketone.

5. β-[3-(3-azabicyclo[3.2.2.]nonyl)]-ethyl 4-methoxystyryl ketone.

6. β-[3-(2-azabicyclo[3.2.2.]nonyl)]-ethyl β-(2-furyl)-vinyl ketone.

7. β-[3-(3-azabicyclo[3.2.2.]nonyl)] - ethyl β-(5-nitro-2-furyl)-vinyl ketone.

8. β-[3-(3-azabicyclo[3.2.2.]nonyl)]-ethyl 5 - nitro - 2-furyl ketone.

References Cited by the Examiner

Blanton et al.: J. Pharm. Sci., vol. 51, pp. 878–881 (1962).

Gilman et al.: J. Am. Chem. Soc., vol. 47, pp. 245–247 and 254 (1925).

ALEX MAZEL, *Primary Examiner*.

NICHOLAS RIZZO, *Examiner*.

HENRY R. JILES, WALTER A. MODANCE, A. D. ROLLINS, *Assistant Examiners*.